(12) United States Patent
Zahdeh et al.

(10) Patent No.: US 9,133,745 B2
(45) Date of Patent: Sep. 15, 2015

(54) SPLIT/DUAL PLANE INTEGRATED EXHAUST MANIFOLD FOR DUAL SCROLL TURBO CHARGER

(71) Applicant: GM Global Technology Operations LLC, Detroit, MI (US)

(72) Inventors: Akram R. Zahdeh, Rochester Hills, MI (US); Colin Blacklock Bosman, Rochester Hills, MI (US); Kenneth M. Eastman, Troy, MI (US); Robert S. McAlpine, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 14/015,240

(22) Filed: Aug. 30, 2013

(65) Prior Publication Data
US 2015/0059339 A1 Mar. 5, 2015

(51) Int. Cl.
| | |
|---|---|
| *F01N 1/00* | (2006.01) |
| *F01N 3/02* | (2006.01) |
| *F02B 33/44* | (2006.01) |
| *F02F 1/36* | (2006.01) |
| *F02F 1/40* | (2006.01) |
| *F02F 1/42* | (2006.01) |
| *F01N 3/04* | (2006.01) |
| *F01N 13/10* | (2010.01) |
| *F02B 37/02* | (2006.01) |

(52) U.S. Cl.
CPC ............... *F01N 3/046* (2013.01); *F01N 13/10* (2013.01); *F01N 13/107* (2013.01); *F02B 37/02* (2013.01); *F02B 37/025* (2013.01); *F01N 2260/024* (2013.01)

(58) Field of Classification Search
CPC ....... F01N 3/046; F01N 13/10; F01N 13/107; F02B 37/025; F02F 1/243; Y02T 10/144
USPC ................... 60/321, 323, 605.1; 123/41.82 R
See application file for complete search history.

(56) References Cited

U.S. PATENT DOCUMENTS

| | | | |
|---|---|---|---|
| 2009/0241526 A1* | 10/2009 | Son et al. ......................... | 60/321 |
| 2012/0227686 A1* | 9/2012 | D'Anna et al. ......... | 123/41.82 R |

FOREIGN PATENT DOCUMENTS

JP            10047053 A    *  2/1998  ................ F01N 7/10

* cited by examiner

*Primary Examiner* — Audrey K Bradley
(74) *Attorney, Agent, or Firm* — Harness, Dickey & Pierce, P.L.C.

(57) ABSTRACT

An integrated exhaust manifold for use with an internal combustion engine and dual scroll turbocharger. The integrated exhaust manifold includes a first exhaust passageway fluidly connected between a first pair of piston cylinders and the dual scroll turbocharger for transporting exhaust gas from the first pair of piston cylinders to a first input of dual scroll turbocharger. The integrated exhaust manifold includes a second exhaust passageway fluidly connected between a second pair of piston cylinders and the dual scroll turbocharger for transporting exhaust gas from the second pair of piston cylinders to a second input of the dual scroll turbocharger. The second exhaust passageway is fluidly independent from the first exhaust passageway and the first and second exhaust passageways are positioned to define a septum area therebetween. A cooling system having a septum cooling jacket is use to cool the septum area between the first and second exhaust passageways.

4 Claims, 3 Drawing Sheets

SPLIT/DUAL PLANE INTEGRATED EXHAUST MANIFOLD FOR DUAL SCROLL TURBO CHARGER

FIELD

The present disclosure relates to engine cylinder heads and, more particularly, relates to a split, dual plane integrated exhaust manifold for use with a dual scroll turbocharger.

BACKGROUND

This section provides background information related to the present disclosure which is not necessarily prior art.

Recently, there has been renewed interest in the use of turbocharging in internal combustion engines. As is well known, turbochargers are useful in providing compressed air in to the induction system of the engine to provide increased engine performance relative to normally aspirated engines. In fact, it has been found that in many applications use of a turbocharging system can permit sufficient increased performance to enable smaller engines to be used therein. As a result, overall fuel efficiency of the vehicle can be substantially improved.

Generally, normally aspirated engines pull or otherwise suck air into the combustion chamber in response to the mechanical downward intake stroke of the piston. In this way, atmospheric pressure is used to drive air into the combustion chamber via the intake valve in response to the downward intake stroke of the piston. However, turbochargers can be used to increase the pressure of this air upstream of the intake valve to permit a higher density of air to be forced, or drawn, into the combustion chamber. This increased air density can be mixed with increased fuel, thereby converting more fuel energy into usable power.

Turbochargers generally include a compressor for drawing in ambient air and compressing it as it enters the intake manifold. This results in a greater mass of air entering the cylinders on each intake stroke. The compressor of the turbocharger is mechanically spun in response to a turbine or scroll. The scroll is disposed within the exhaust stream and thus turns in response to the kinetic energy of the engine's exhaust gases.

It should be understood that typical exhaust streams of internal combustion engines are not constant. That is, as the engine operates and each of the individual cylinders operates through their combustion cycles, burned exhaust gases are released during an upward exhaust stroke of the piston. During this exhaust stroke, a plug or pulse of exhaust gases is forced out of the combustion chamber and into the exhaust system of the engine. This plug of exhaust gases flows along the exhaust system to the turbocharger and impacts the scroll of the turbocharger, thereby rotatably driving the scroll and the associated compressor. However, in some applications, these plugs or pulses can overlap in such a way as to reduce the effective flow of the exhaust stream, thereby reducing the available kinetic energy available to drive the turbocharger. This is particularly evident in engines having few cylinders as each pulse is more readily discernible.

In these applications, a dual scroll or twin scroll turbocharger can be used in which separated exhaust manifolds from selected cylinders are routed to one of two exhaust inlets of a single turbocharger. This technique of separating the exhaust streams can permit efficient use of the kinetic energy of the exhaust streams and can vastly improve the low end performance of the turbocharger and enhance the transient response of the engine.

However, turbocharging systems and the associated exhaust system operate at extremely high temperatures. For example, in some applications, the exhaust gases existing the combustion chamber and traveling to the inlet of the turbocharger can reach 950° C. or higher. These temperatures are often greatest when the engine is operated at its ideal stoichiometric mixture—that is, at the air to fuel ratio that permits generally all fuel to be oxidized without excess air.

Therefore, there exists a need in the relevant art to provide an integrated exhaust manifold capable of providing split exhaust routing to a dual scroll turbocharger. Moreover, there exists a need in the relevant art to provide a cooling system for use with an integrated exhaust manifold to maintain proper temperatures for equipment protection. Furthermore, there exists a need in the relevant art to provide a cooling system for use with an integrated exhaust manifold capable of permitting stoichiometric operation across the entire speed and load maps of the engine.

SUMMARY

This section provides a general summary of the disclosure, and is not a comprehensive disclosure of its full scope or all of its features.

According to the principles of the present teachings, an integrated exhaust manifold (e.g. an exhaust manifold cast into a cylinder head) for use with an internal combustion engine and dual scroll turbocharger is provided having advantageous construction and operation. The integrated exhaust manifold includes a first exhaust passageway fluidly connected between a first pair of piston cylinders and the dual scroll turbocharger for transporting exhaust gas from the first pair of piston cylinders to a first input of dual scroll turbocharger. The integrated exhaust manifold includes a second exhaust passageway fluidly connected between a second pair of piston cylinders and the dual scroll turbocharger for transporting exhaust gas from the second pair of piston cylinders to a second input of the dual scroll turbocharger. The second exhaust passageway is fluidly independent from the first exhaust passageway and the first and second exhaust passageways are positioned to define a septum area therebetween. A cooling system having a septum cooling jacket is use to cool the septum area between the first exhaust passageway and the second exhaust passageway.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
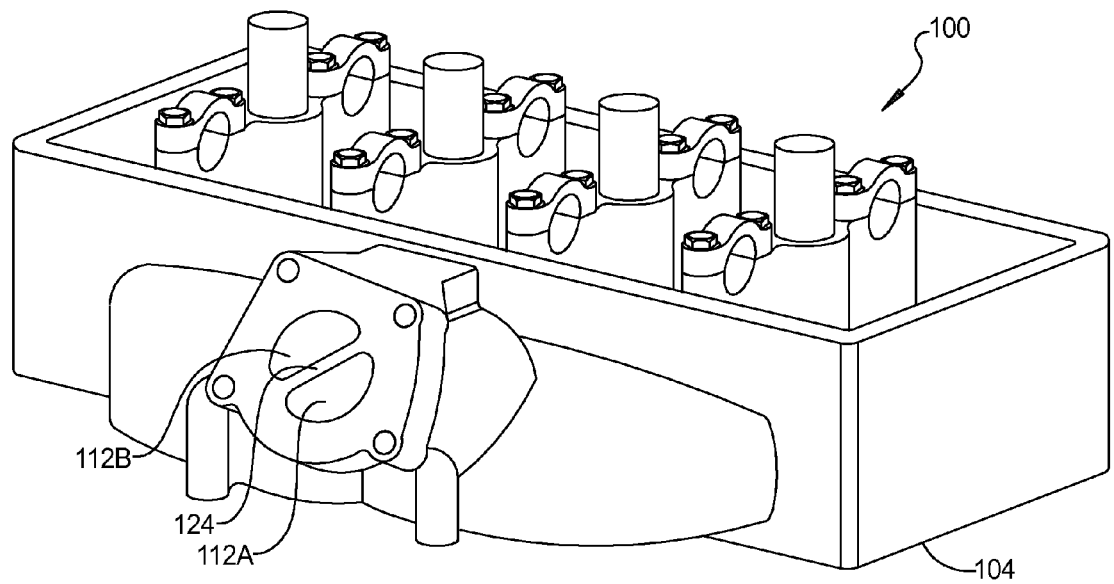
FIG. 1 is a perspective view of an upper head assembly of an engine according to some embodiments of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-6B, a split, dual plane integrated exhaust manifold and cooling system 10 is illustrated in connection with an internal combustion engine cylinder head 100 according to the principles of the present teachings. Internal combustion engine cylinder head 100 can comprise a plurality of piston cylinders being disposed in a generally linear or inline arrangement, or other suitable orientation. For purposes of illustration, the plurality of piston cylinders will be referred to as a first cylinder 102A, a second cylinder 102B, a third cylinder 102C, and a fourth cylinder 102D (see FIGS. 3, 6A, and 6B). It should be recognized that the principles of the present teachings are not limited to only four cylinder internal combustion engine applications. The principles of the present teachings are equally applicable to engines having any number of multiple cylinders, including, but not limited to, three, five, six, eight, ten, twelve, and the like (e.g. 102A-102n) (see FIGS. 6A and 6B).

The plurality of piston cylinders are topped via a cylinder head assembly 104 (FIG. 1). In some embodiments, cylinder head assembly 104 can be made of any material conducive to the anticipated structural and other demands, such as aluminum, aluminum alloy, iron, multi-material combinations (e.g. sleeves), and other conventional materials. Cylinder head assembly 104 comprises a plurality of passages for transferring combustion materials, such as exhaust gases, to the exhaust system and, further, includes passages for cooling the cylinder head assembly 104 and associated structure.

Figure 3:
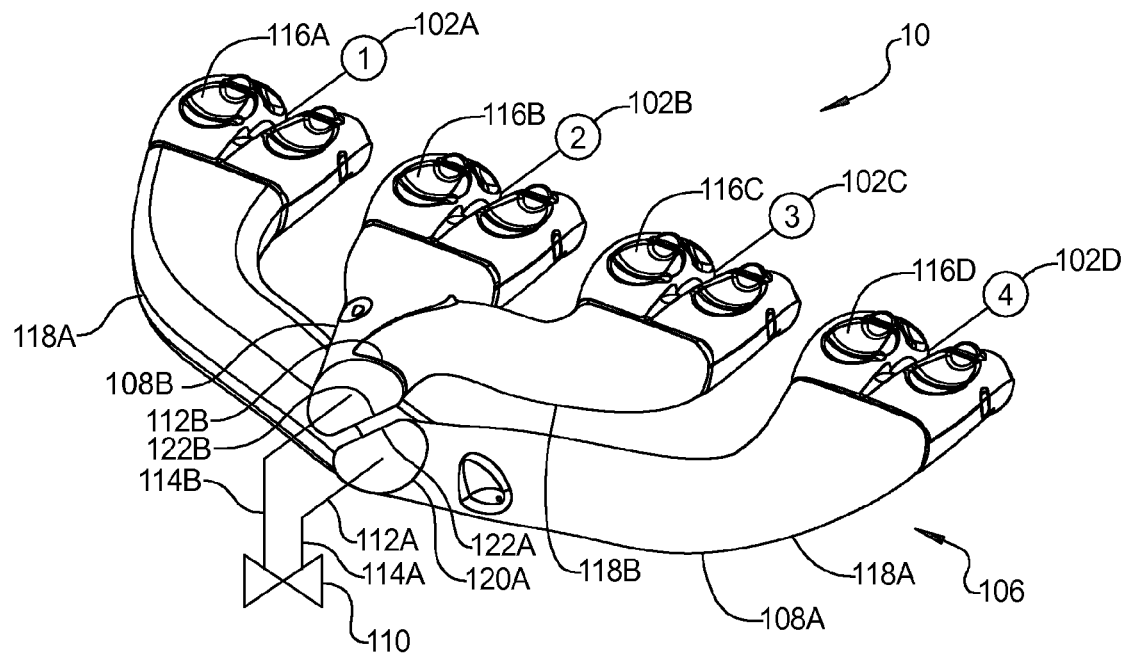
FIG. 3 is a perspective view of an exhaust manifold according to the principles of the present teachings.
Figure 6A:
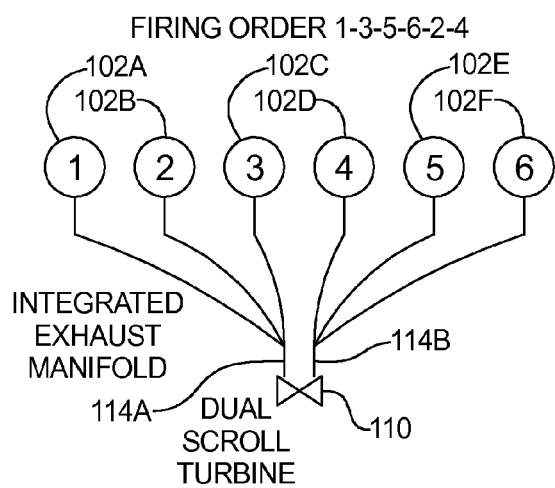
FIG. 6A is a schematic view of the firing order and associated exhaust routing according some embodiments of the present teachings.
Figure 6B:
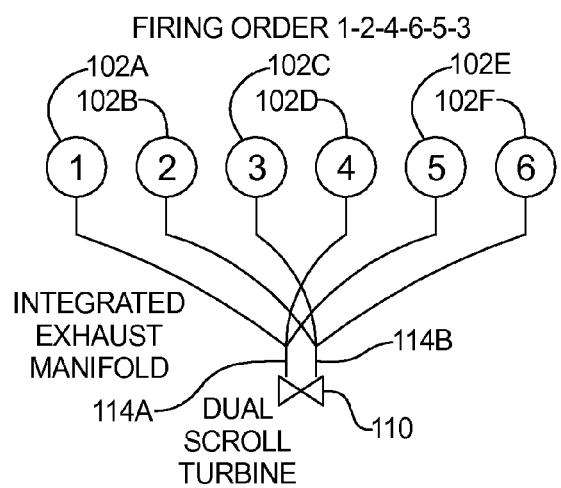
FIG. 6B is a schematic view of the firing order and associated exhaust routing according some embodiments of the present teachings.

Specifically, with reference to FIGS. 1 and 3, in some embodiments, cylinder head assembly 104 can comprise an integrated exhaust system having an exhaust manifold 106 extending at least partially through cylinder head assembly 104. As best seen in FIG. 3, which represents the internal passageways of exhaust manifold 106 for clarity, exhaust manifold 106 can comprise two or more passageway sections 108A, 108B that are each configured to transmit exhaust gases from a corresponding one or more piston cylinders 102 to a dual-scroll turbocharger 110 (FIGS. 3, 6A, 6B). It should be understood that the particular size, configuration, and routing of each of the sections 108A, 108B can vary depending upon the specific application, number of cylinders, number of turbochargers, cylinder firing order, and the like. However, the principles of the present teachings remain unchanged and are equally applicable.

In some embodiments as illustrated in FIG. 3, exhaust manifold 106 can comprise a first passageway section 108A being fluidly coupled to piston cylinders 102A and 102D to form a first exhaust output 112A. Similarly, exhaust manifold 106 can comprise a second passageway section 108B being fluidly coupled to piston cylinders 102B and 102C to form a second exhaust output 112B. It should be recognized that first passageway section 108A and second passageway section 108B are each fluidly independent from the other. In this way, first passageway section 108A and first exhaust output 112A can be operably coupled to a first input 114A of turbocharger 110 and second passageway section 108B and second exhaust output 112B can be operably coupled to a second input 114B of turbocharger 110.

More particularly, in some embodiments, first passageway section 108A of exhaust manifold 106 can comprise one or more exhaust valve sections 116A, 116D being connected with the exhaust valve ports of piston cylinders 102A and 102D. Exhaust valve sections 116A, 116D are fluidly coupled to a first passageway branch 118A terminating at first exhaust output 112A. Likewise, second passageway section 108B of exhaust manifold 106 can comprise one or more exhaust valve sections 116B, 116C being connected with the exhaust valve ports of piston cylinders 102B and 102C. Exhaust valve sections 116B, 116C are fluidly coupled to a second passageway branch 118B terminating at second exhaust output 112B. In some embodiments, first passageway branch 118A can define a first plane extending generally through a central area of first passageway branch 118A. Second passageway branch 118B can define a second plane extending generally through a central area of second passageway branch 118B. The second plane can be positioned at a different or higher elevation relative to the first plane to permit improved packaging.

Figure 2:
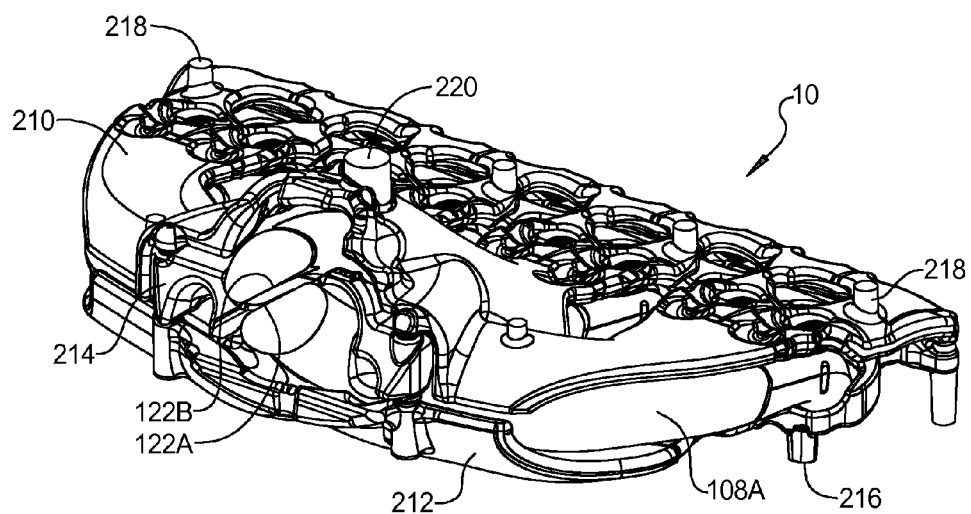
FIG. 2 is a perspective view of a split, dual plane integrated exhaust manifold and cooling jacket, and exhaust manifold, according to the principles of the present teachings.

In some embodiments, as illustrated in FIGS. 1-3, first exhaust output 112A can comprise a half-circle cross-section having an arcuate outer edge 120A and a substantially flat inner edge 122A. Second exhaust output 112B can also comprise a half-circle cross-section having an arcuate outer edge 120B and a substantially flat inner edge 122B. In some embodiments, a centroid of first arcuate outer edge 120A and a centroid of second arcuate outer edge 120B are substantially aligned. However, it should be understood that these centroids need not be identically aligned. In this way, flat inner edges 122A and 122B together define a septum area 124 disposed therebetween. Septum area 124 will be discussed in greater detail herein. It should be understood, however, that the specific orientation of first exhaust output 112A and second exhaust output 112B can be varied. For example, in some embodiments, first exhaust output 112A and second exhaust output 112B can be oriented as illustrated such that septum area 124 is inclined relative to a plane defined by the series of exhaust valve sections 116. For example, septum area 124 can be inclined as illustrated as about a 45° angle. However, in some embodiments, first exhaust output 112A can be stacked on top of second exhaust output 112B to define a generally horizontal septum area 124. Likewise, in some embodiments, first exhaust output 112A can be positioned side-by-side with second exhaust output 112B to define a generally vertical septum area 124.

According to the aforementioned configurations, it should be understood that during the exhaust stroke, a plug or pulse of exhaust gases is forced out of the combustion chamber of each of the plurality of piston cylinders 102 and into the exhaust manifold 106 as described. These plugs of exhaust gases flow along the exhaust manifold 106, specifically first passageway branch 118A and second passageway branch 118B, to the turbocharger 110 and impacts the scroll of the turbocharger 110, thereby rotatably driving the scroll and the associated compressor. According to the principles of the present teachings, these plugs or pulses are harnessed to achieve a balanced usage in the dual scroll turbocharger 110. That is, based on the firing order of the cylinders, the resultant exhaust gases flow in such a way as to achieve a consistent and balanced series of exhaust gas pulses without destructive pulse cancellations. For example, in some embodiments as illustrated in FIG. 6A, a firing order of 1-3-5-6-2-4 can be used and routed to achieve the aforementioned consistent and balanced series of exhaust gas pulses by routing pulses from cylinder 102A and 102C to first input 114A of turbocharger 110. Pulses from cylinder 102E and 102F can then be routed to second input 114B of turbocharger 110. Finally, pulses from cylinder 102B can then be routed to first input 114A and pulses from cylinder 102D can then be routed to second input 114B. Similarly, as illustrated in FIG. 6B, an alternating series of pulses can be routed from cylinder 102A to first input 114A, cylinder 102B to second input 114B, cylinder 102D to first input 114A, cylinder 102F to second input 114B, cylinder 102E to first input 114A, and cylinder 102C to second input 114B, sequentially.

In order to cool the associated structure, split, dual plane integrated exhaust manifold and cooling system 10 can comprise a plurality of cooling jackets operable to remove heat from the associated structure. In this way, the components of exhaust manifold 106 and the associated structure can be sufficiently cooled to permit operation of the engine at a stoichiometric mixture. That is, traditionally, operation of internal combustion engines at the stoichiometric mixture results in elevated exhaust gas temperatures. These temperatures consequently increase the temperature of the combustion chamber, exhaust valve, exhaust system, and any downstream components, such as turbochargers. The increased use of lightweight materials in the manufacture of modern engines has resulted in a need to more efficiently extract latent heat from the system to avoid damage to engine components.

Figure 4:
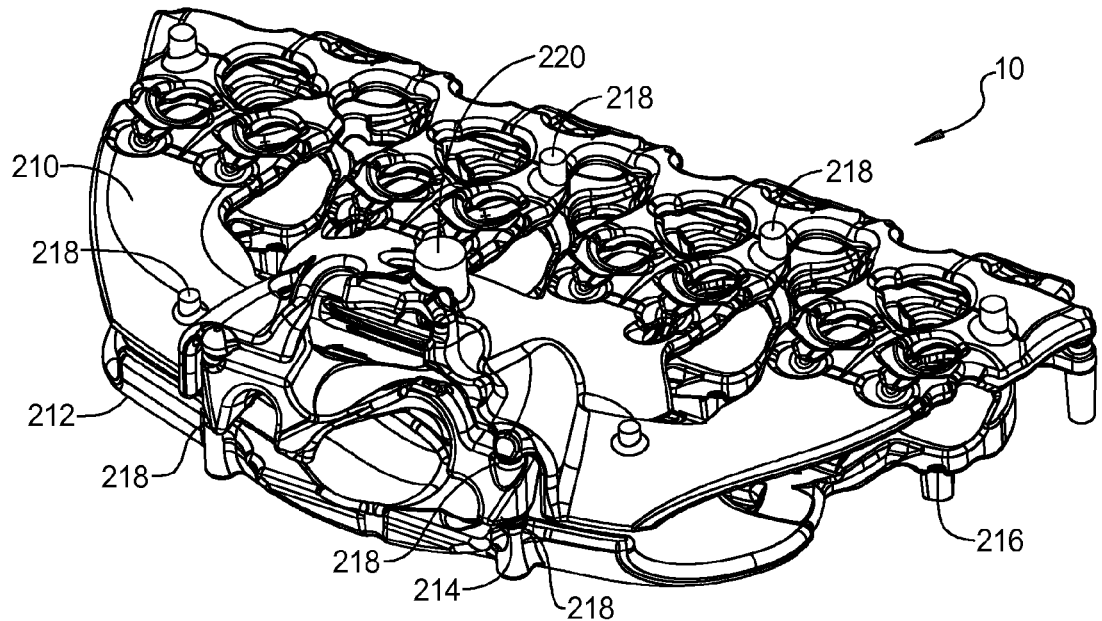
FIG. 4 is a perspective view of the split, dual plane integrated exhaust manifold and cooling jacket, having the exhaust manifold removed for clarity, according to the principles of the present teachings.
Figure 5:
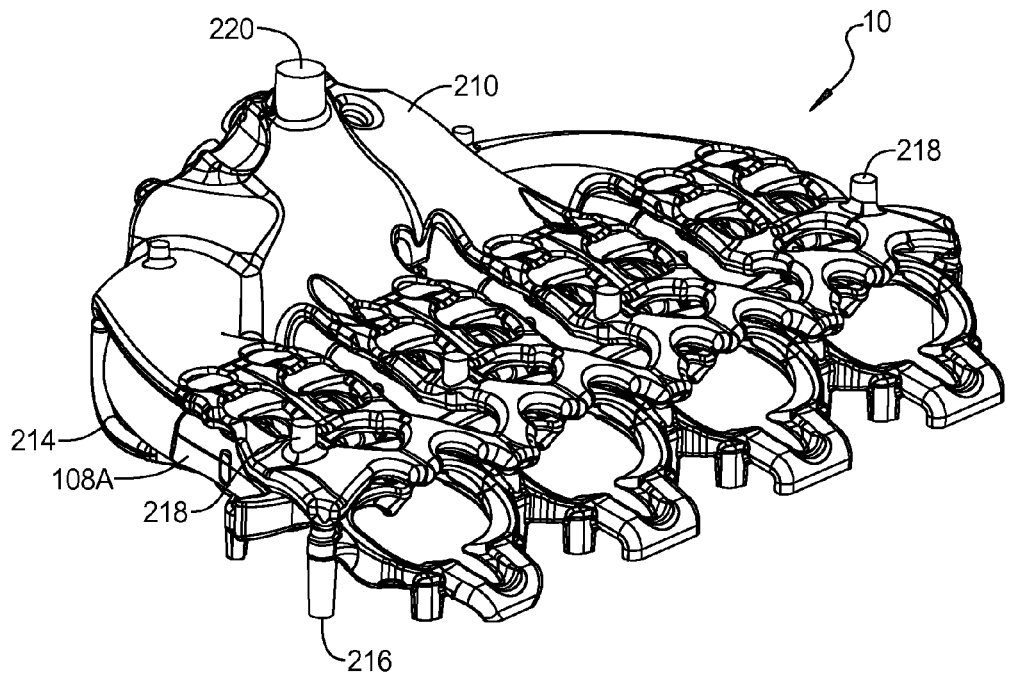
FIG. 5 is a rear perspective view of the split, dual plane integrated exhaust manifold and cooling jacket, and exhaust manifold, according to the principles of the present teachings.

To this end, in some embodiments as illustrated in FIGS. 2, 4, and 5, the present teachings provide an upper head cooling jacket 210 (upper or first cooling jacket), a lower head cooling jacket 212 (lower or second cooling jacket), and a septum cooling jacket 214 (middle or third cooling jacket). Each of the cooling jackets 210, 212, and 214 are configured to receive a liquid coolant therein and the figures represent the internal passageways of the cooling jackets 210, 212, and 214 for clarity. The liquid coolant is operable to flow through the cooling jackets and transport heat from the operating surfaces of the engine to a heat exchanger, such as a radiator.

In some embodiments, upper head cooling jacket 210, lower head cooling jacket 212, and septum cooling jacket 214 are fluidly coupled to each other to permit liquid coolant to flow from one cooling jacket to an adjacent cooling jacket. It should be understood, however, that the particular flow pattern is not limited to merely series flow or parallel flow, but can encompass any combination thereof. In some embodiments, liquid coolant enters lower head cooling jacket 212 from one or more input lines 216. Liquid coolant then flows through the passageways of lower head cooling jacket 212 and into both upper head cooling jacket 210 and septum cooling jacket 214 through a plurality of vias 218. Likewise, liquid coolant from septum cooling jacket 214 can flow into upper head cooling jacket 210 through vias 218. Finally, the liquid coolant can be extracted from upper head cooling jacket using one or more output lines 220.

Upper head cooling jacket 210, lower head cooling jacket 212, and septum cooling jacket 214 are each closely positioned to extract heat from adjacent portions of the engine. In particular, septum cooling jacket 214 is configured to be routed between first exhaust output 112A and second exhaust output 112B along septum area 124. That is, septum cooling jacket 214 is positioned at the septum area 124 located between the first passageway section 108A and second passageway section 108B to permit cooling thereof. Without cooling of septum area 124, this portion of the engine is exposed to the head within the exhaust stream flow from cylinders 102A, 102D and cylinders 102B, 102C. This can be seen in FIG. 1 as the metallic portion, labeled 124, extending between first exhaust output 112A and second exhaust output 112B. However, according to the principles of the present teachings, this septum area 124 is cooled using septum cooling jacket 214 extending through septum area 124. This active cooling permits septum area 124 to remain within its suitable operational temperature range. Moreover, in some embodiments, because of the cooling efficiency of septum cooling jacket 214, the engine is permitted to operate at the stoichiometric ratio (with its resultant higher operating temperatures), and the septum area 124 can still remain properly cooled. In doing so, the operation of the engine at the stoichiometric ratio results in greater fuel efficiency of the engine.

In some embodiments, the cooling system can be configured to permit rapid warm-up of the engine and associated systems for greater efficiency. That is, by reducing the flow rate of the liquid coolant during initial startup, the heat associated with operation of the engine can be used to more rapidly increase the temperature of the pistons, piston rings, engine oil, transmission oil, heater core, and catalytic converter. The quicker the operating temperature is achieved; a higher operational efficiency can be realized.

Therefore, according to the principles of the present teachings, an internal combustion engine is provided having improved operational efficiencies. Specifically, the internal combustion engine provides improved operational efficiency through the use of a dual scroll turbocharger. The dual scroll nature of the turbocharger provides improved operational range—for example, it is operational effective at lower engine RPMs and remains effective at higher engine RPMs. The exhaust streams and associated pulses are routed to the dual scroll turbocharger as separate streams from predetermined cylinders to avoid the disadvantageous cancellation of exhaust pulses. The ability to route separate streams to the dual scroll turbocharger is further made possible through the use of a multi-jackets cooling system having a septum cooling jacket disposed between the exhaust streams to ensure that this area remains within proper operational temperatures. This can, in some embodiments, permit operation of the internal combustion engine at higher temperatures, such as those associated with operation at the stoichiometric ratio.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An internal combustion engine comprising:
 a plurality of piston cylinders each operable to combust a chemical mixture and output an exhaust gas;
 a dual scroll turbocharger having first and second inputs;
 an integrated exhaust manifold having an integrally formed cylinder head and exhaust system, said integrated exhaust manifold having a first exhaust passageway fluidly coupled between a first and a second of the plurality of piston cylinders and the dual scroll turbocharger, the first exhaust passageway transporting the exhaust gas from the first and second piston cylinders to the first input of the dual scroll turbocharger, wherein the first exhaust passageway comprises:
 a first exhaust valve section being positioned immediately downstream of an exhaust valve of the first piston cylinder;
 a second exhaust valve section being positioned immediately downstream of an exhaust valve of the second piston cylinder;
 a first branch passageway being fluidly coupled with the first exhaust valve section and the second exhaust valve section to receive the exhaust gases of the first piston cylinder and the second piston cylinder therein, said first branch passageway terminating at a first exhaust output opening directly from an exterior surface of the integrated exhaust manifold;
 the integrated exhaust manifold further having a second exhaust passageway fluidly coupled between a third and a fourth of the plurality of piston cylinders and the dual scroll turbocharger, the second exhaust passageway transporting the exhaust gas from the third and fourth piston cylinders to the second input of the dual scroll turbocharger, the second exhaust passageway comprises:
 a third exhaust valve section being positioned immediately downstream of an exhaust valve of the third piston cylinder;
 a fourth exhaust valve section being positioned immediately downstream of an exhaust valve of the fourth piston cylinder; and
 a second branch passageway being fluidly coupled with the third exhaust valve section and the fourth exhaust valve section to receive the exhaust gases of the third piston cylinder and the fourth piston cylinder therein,
 the second exhaust passageway being fluidly independent from the first exhaust passageway, the first exhaust passageway and the second exhaust passageway positioned to define a septum area therebetween, said second branch passageway terminating at a second exhaust output opening directly from the exterior surface of the integrated exhaust manifold, wherein the first exhaust output and the second exhaust output each include a half circle cross section with an arcuate outer edge and a substantially flat inner edge such that the substantially flat inner edge of said first exhaust output and the substantially flat inner edge of said second exhaust output are positioned directly along opposite side edges of the septum area to form the septum area therebetween; and
 a cooling system having an upper head cooling jacket, a lower head cooling jacket and a septum cooling jacket, the septum cooling jacket receiving a liquid coolant and routing the liquid coolant through at least a portion of the septum area between the first exhaust passageway and the second exhaust passageway, and a coolant output line extending from an upper surface of the upper head cooling jacket.

2. The internal combustion engine according to claim 1 wherein the first branch passageway is positioned at a first elevation and the second branch passageway is positioned at a second elevation, the second elevation being different than the first elevation such that the second branch passageway is offset relative to the first branch passageway.

3. The internal combustion engine according to claim 1 wherein the combination of the third and fourth piston cylinders are positioned between the first and the second piston cylinders such that the first exhaust valve section and the second exhaust valve section are positioned outboard from the third exhaust valve section and the fourth exhaust valve section.

4. The internal combustion engine according to claim 1 wherein the cooling system further comprises:
   an upper cooling jacket; and
   a lower cooling jacket,
   wherein the upper cooling jacket is positioned above the first exhaust passageway and the second exhaust passageway, the lower cooling jacket is positioned below the first exhaust passageway and the second exhaust passageway.

* * * * *